United States Patent
Williams

(10) Patent No.: US 7,467,478 B1
(45) Date of Patent: Dec. 23, 2008

(54) ADJUSTABLE MOTORCYCLE FITTING FRAME

(75) Inventor: Marcus Scott Williams, Springfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/972,928

(22) Filed: Jan. 11, 2008

(51) Int. Cl.
*G01D 21/00* (2006.01)
(52) U.S. Cl. .................. 33/608; 33/645; 33/203
(58) Field of Classification Search ............... 33/608, 33/613, 645, 549, 555, 203, 288, 533
See application file for complete search history.

(56) References Cited

U.S. PATENT DOCUMENTS

| | | | |
|---|---|---|---|
| 4,432,144 A * | 2/1984 | Carlsson | 33/608 |
| 5,364,271 A | 11/1994 | Aknin et al. | |
| 5,694,699 A * | 12/1997 | Folson | 33/645 |
| 5,967,946 A | 10/1999 | Beatty, Jr. | |
| 6,269,578 B1 * | 8/2001 | Callegari | 42/94 |
| 6,764,310 B1 * | 7/2004 | Ichihashi et al. | 434/61 |
| 6,793,609 B1 | 9/2004 | Fan | |
| 6,839,976 B2 * | 1/2005 | Winkenbach et al. | 33/549 |
| 6,881,178 B1 | 4/2005 | Goldberg | |
| 2002/0119868 A1 | 8/2002 | Chao | |
| 2004/0248702 A1 | 12/2004 | Baker | |
| 2005/0043147 A1 | 2/2005 | Huang | |

* cited by examiner

*Primary Examiner*—Yaritza Guadalupe-McCall
(74) *Attorney, Agent, or Firm*—Jason H. Foster; Kremblas, Foster, Phillips & Pollick

(57) ABSTRACT

An adjustable motorcycle-fitting frame for identifying or verifying comfortable or otherwise desirable seat, handle bar, and foot peg positions for use in the design and fabrication of a motorcycle. Once the component parts of the frame are adjusted to a comfortable "fit," the actual motorcycle frame and additional components can be designed and fabricated around this fit. The adjustable frame enables the designer to sit upon and feel the ride stance of the components during the design stage, rather than guess what would be desirable until after a prototype is made.

20 Claims, 3 Drawing Sheets

ADJUSTABLE MOTORCYCLE FITTING FRAME

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to motorcycle design and fabrication, and more particularly to the identification and verification of comfortable "hard point" (i.e. seat, handle bar, and foot peg) positions for use in the design of a motorcycle.

2. Description of the Related Art

"Hard points" are those parts of a motorcycle that are interfaced by a rider, including the seat, the handles, and the foot pegs. It is desirable to have these hard points positioned on a motorcycle so as to provide a rider with a comfortable riding posture, and a posture that permits excellent control of the vehicle. It is also desirable to identify desirable hard point positions early in the process of designing a motorcycle, so that other components of the motorcycle can be designed around the hard points. In the past, motorcycle designers had to engage in a considerable amount of time-consuming trial and error in order to determine suitable "hard point" positions for a particular motorcycle design.

It is an object of the present invention to provide a device that permits a designer to identify or verify desirable hard point positions prior to any fabrication of the motorcycle.

BRIEF SUMMARY OF THE INVENTION

In accordance with the present invention, there is provided an adjustable frame having two frame stands, a component rail, a seat frame, a handle bar frame, and a foot peg frame. Each of the components is connected in a configuration that provides adjustable hard points. The component rail is defined by an elongated shaft that is oriented substantially parallel to the surface on which the frame stands are seated. The component rail has a plurality of component positioning holes disposed along its length. The component rail also has two legs extending downwardly, each from a point near each of its respective ends, for fitting within and slidably engaging the mounting sleeves of the frame stands. Each frame stand is seated on a flat surface, such as a floor or the ground.

The seat frame has a seat cuff, a seat post, and a seat. The seat cuff surrounds and slidably engages the component rail, and the seat post extends upwardly, in an operable orientation, to a seat upon which a rider can rest his or her posterior. The seat post telescopically adjusts.

The handle bar frame has a handle bar cuff, a handle bar post, and a handle bar. The handle bar cuff surrounds and slidably engages the component rail. The handle bar post extends upwardly from the handle bar cuff, and the handle bar is mounted on top of the handle bar post.

The foot peg frame has a foot peg cuff, a foot peg post, and a foot peg bar. The foot peg cuff surrounds and slidably engages the component rail. The foot peg post extends downwardly from the foot peg cuff, and the foot peg bar is mounted on the bottom of the foot peg post. The foot peg post allows for telescopic height adjustment of the foot peg bar.

The height of the seat, the handle bar, and the foot pegs may be adjustably positioned by moving the structures until a positioning hole of their respective shafts is aligned with the positioning hole of their respective sleeves at a desired position and connecting the structures with a locking pin through the aligned holes. The longitudinal position of the seat, the handle bar, and the foot pegs may be adjusted by aligning the positioning holes of their respective cuffs with a component positioning hole at a desired longitudinal position and inserting a locking pin in the aligned holes.

In order to identify or verify comfortable hard points positions for a particular motorcycle design, a designer will typically adjust the component rail, seat, handle bar, handles, and foot peg bar to positions that are determined by preliminary design estimates, previous experience, and other factors. The designer then sits on the seat and engages the handles and foot pegs with his or her hands and feet. The designer adjusts the positions of the various components until a suitable riding posture is found. Once these hard points are located, the measurements relative to a particular reference point can be taken.

Figure 1:
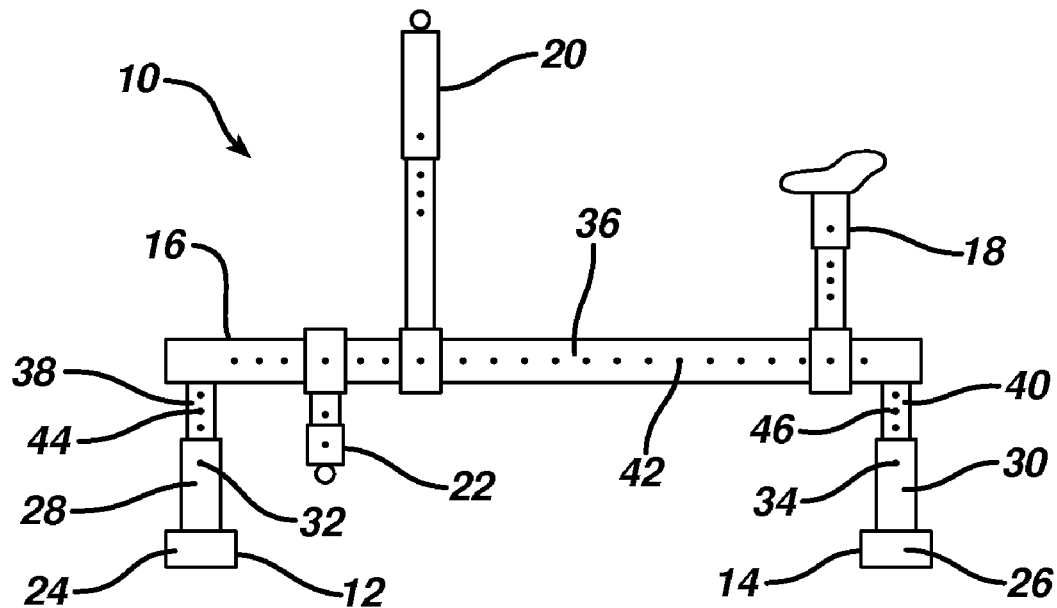
FIG. 1 is a side view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

As shown in FIG. 1, the adjustable frame 10 includes two frame stands 12 and 14, a component frame 16, a seat frame 18, a handle bar frame 20, and a foot peg frame 22. Unless otherwise noted, all of the components are fabricated from steel members and square tubing members in particular. However, the use of any other suitable material, or combination of materials, is contemplated and will be understood by the person having ordinary skill.

Figure 2:
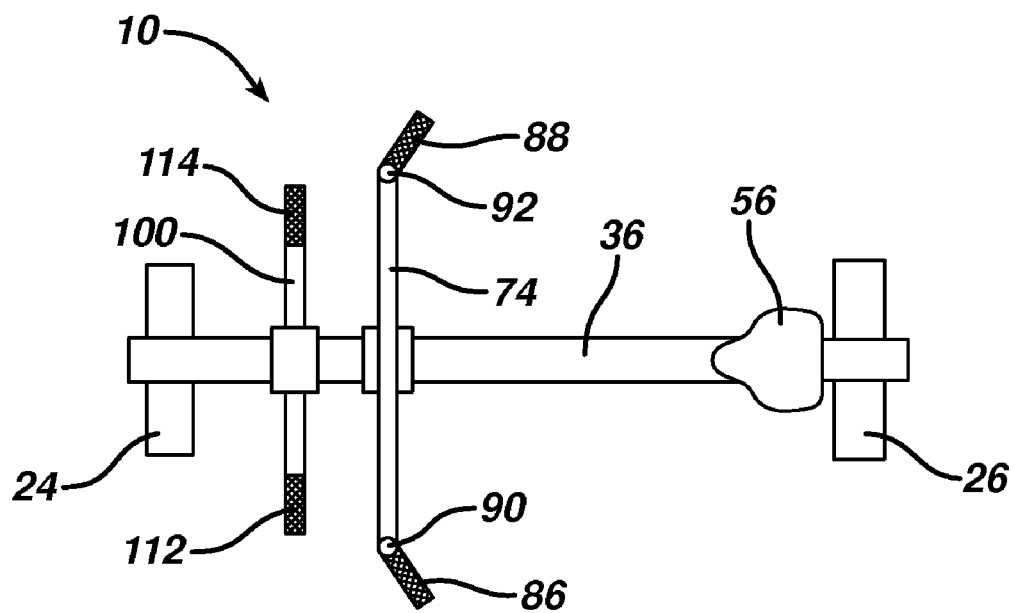
FIG. 2 is a top view illustrating the embodiment of FIG. 1.

Referring to FIGS. 1 and 2, the frame stands 12 and 14 are preferably substantially identical, inverted T-shaped bodies. The frame stands 12 and 14 include the bases 24 and 26, which seat against the surface upon which the adjustable frame 10 rests, and the mounting sleeves 28 and 30, which extend upwardly in an operable orientation, from the bases 24 and 26, respectively. The surface upon which the bases seat will typically be the floor of a building, but could include soil, pavement or other surface outdoors. The bases 24 and 26 are laterally oriented members that seat on the surface and remain substantially parallel with one another. The bases 24 and 26 are aligned longitudinally to provide a stable support against lateral movement by the adjustable frame 10. An example of an acceptable longitudinal distance between the bases 24 and 26 is seven feet. The bases 24 and 26 could, alternatively, be X-shaped, circular, or any other shape that would provide the lateral stability needed to prevent the adjustable frame 10 from swaying or tipping during use. Terms such as "longitudinal" and "lateral" are used herein to describe orientation relative to the length of the component frame 16. For the sake of convenience and clarity, the relative placement and sizes of these components are defined with respect to the axis of the component frame 16.

Each of the mounting sleeves 28 and 30 is a hollow, elongated body that extends perpendicularly upwardly from the center of its respective base with a rigid connection thereto. The mounting sleeves 28 and 30 have mounting sleeve positioning holes 32 and 34 located near their top edges and at their longitudinal midpoints, each of which provides a transverse, lateral passageway through its respective mounting sleeve. An example of an acceptable diameter for each mounting sleeve positioning hole is 0.5 inches. The term "hole" is often used hereinafter to refer to a pair of axially aligned apertures, wherein one of the apertures is positioned on one sidewall of a hollow body, such as a tube, and the other aperture is positioned on the opposing sidewall. Each "hole" thereby provides a single passageway through the entire body, even though only one of the apertures of the hole is depicted in the illustrations. For example, only one of the apertures in each pair is depicted in FIGS. 1, 4, 5 and 6. The other apertures are on the side of the structure but are impossible to show in an illustration of a three dimensional object.

The component frame 16 includes a component rail 36 and two legs 38 and 40. The component rail 36 is an elongated body that is, in an operable position, oriented substantially parallel to the surface on which the bases 24 and 26 sit and is oriented substantially perpendicular to the laterally oriented bases 24 and 26. This provides a stable support for the other components, because the width of the bases 24 and 26 provides support against lateral tipping, and the distance between the bases provides support against longitudinal tipping.

The component rail 36 has a set of component rail positioning holes 42 horizontally disposed and evenly-spaced along its length. Each component positioning hole provides a transverse, lateral passageway through the horizontal axis of the component rail 36. An example of an acceptable diameter for each component positioning hole is 0.5 inches, and an example of an acceptable longitudinal distance between each component positioning hole is 1 inch. Of course, the size and spacing of these, and all other holes described herein, are not limited to the sizes given as examples.

The legs 38 and 40 extend perpendicularly downwardly (in the orientation of FIG. 1) from rigid connections to the component rail 36. The leg 38 extends from a point approximately 6 inches from the fore end of the component rail 36 and the leg 40 extends from a point approximately 6 inches from the aft end of the component rail 36. The legs 38 and 40 fit within and axially engage the mounting sleeves 28 and 30 in the manner of a telescope. The exterior dimensions of the legs 38 and 40 are slightly smaller than the interior dimensions of the mounting sleeves 28 and 30, in order that the sleeves may snugly receive the legs while allowing sliding axial movement of the legs relative to the sleeves. Of course, the sizes of the components can be reversed so that the mounting sleeves 28 and 30 fit within and axially engage the legs 38 and 40.

Each of the legs 38 and 40 has a plurality of leg positioning holes 44 and 46 vertically disposed and evenly-spaced along its height. Each such hole provides a transverse, lateral passageway through the respective leg that can align with other holes in order that the legs can be mounted to the mounting sleeves 28 and 30. An example of an acceptable diameter for each leg positioning hole is 0.5 inches, and an example of an acceptable vertical distance between each leg positioning hole is 1 inch.

In order to adjust the height of the component rail 36, the component frame 16 is raised or lowered to cause the legs 38 and 40 to slide telescopically upwardly or downwardly within the mounting sleeves 28 and 30. When the desired height of the component rail 36 is reached, each of the mounting sleeve positioning holes 32 and 34 is brought into axial alignment with a closest leg positioning hole. Stand pins are then inserted through each pair of aligned holes to secure the legs 38 and 40 against vertical movement, thereby fixing the component frame 16 at the desired height for stably supporting the component frame 16 from tipping. The stand pins, as well as all of the positioning pins described below, are standard spring-loaded positive locking pins with an outer diameter slightly smaller than the diameter of the respective holes through which they pass. However, all other types of fastening means, such as screws, bolts, rivets, clamps, non-spring-loaded pins, and friction mounts are also contemplated.

It will be appreciated that the component rail 36 and the frame stands 12 and 14 combine to form a structure that is not only stable against lateral and longitudinal tipping, but is strong enough to support the weight of a human body being transferred to the surface only by the stands 12 and 14.

Figure 4:
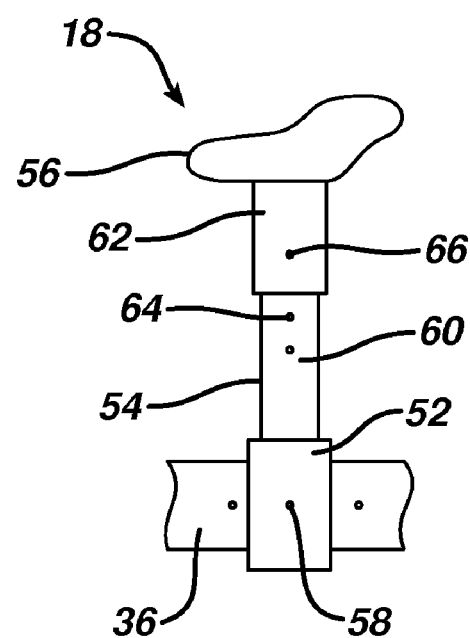
FIG. 4 is an enlarged side view of the seat frame portion of the present invention.

Referring to FIGS. 1, 2 and 4, the seat frame 18 is defined by a seat cuff 52, a seat post 54, and a seat 56. The seat cuff 52 is a body with a rectangular opening that receives the component rail 36 therethrough, to permit the seat cuff 52 to surround and slidably engage the component rail 36 as shown in FIG. 4. The interior dimensions of the seat cuff 52 are slightly larger than the exterior dimensions of the component rail 36. Thus, the seat cuff 52 snugly engages the component rail 36 while allowing longitudinal sliding movement of the seat cuff 52 relative to the component rail 36 for adjustment. An example of an acceptable vertical and lateral distance between the exterior surface of the component rail 36 and the interior surface of the seat cuff 52 is 1 millimeter. An example of an acceptable length for the seat cuff 52 is 6 inches. Preferably, the seat cuff 52 is a short piece of square tubing that is slightly larger than the component rail 36. Additionally, the seat cuff 52 has a seat cuff positioning hole 58 disposed at its vertical and longitudinal midpoint that provides a transverse, lateral passageway through the seat cuff 52. An example of an acceptable diameter for the seat cuff positioning hole 58 is 0.5 inches. The seat cuff 52 is fixed to the component rail 36 by the seat cuff positioning hole 58.

The seat post 54 has an elongated seat shaft 60 that extends upwardly, in an operable orientation, from rigid connection to the seat cuff 52. The seat shaft 60 has a plurality of seat shaft positioning holes 64 vertically disposed and evenly-spaced along its height. Each seat shaft positioning hole provides a transverse, lateral passageway through the vertical axis of the seat shaft 60. An example of an acceptable diameter for each seat shaft positioning hole is 0.5 inches, and an example of an acceptable vertical distance between each seat shaft positioning hole is 1 inch.

The seat mounting sleeve 62 is a hollow, elongated member that is vertically oriented in an operable position with an open bottom end. The seat mounting sleeve 62 also has a seat mounting sleeve positioning hole 66 located above its bottom edge that provides a transverse, lateral passageway through the seat mounting sleeve 62. An example of an acceptable diameter for the seat mounting sleeve positioning hole 66 is 0.5 inches.

The seat mounting sleeve 62 fits over and telescopically engages the seat shaft 60, as the seat shaft 60 extends upwardly into the hollow interior of the seat mounting sleeve 62. The exterior dimensions of the seat shaft 60 are slightly smaller than the interior dimensions of the seat mounting sleeve 62, and the sleeve snugly engages the shaft while allowing vertical, telescopic movement of the seat mounting sleeve 62 relative to the seat shaft 60. An example of an acceptable longitudinal and lateral distance between the exterior surface of the seat shaft 60 and the interior surface of the seat mounting sleeve 62 is 1 millimeter.

The seat 56 is fastened to the top end of the seat mounting sleeve 62, such as by two nut-bolt combinations. All other suitable types of fastening means, such as screws, bolts, clamps, non-spring-loaded pins, and friction mounts are contemplated. The seat 56 is a standard solo motorcycle seat, but all other suitable seat variations are contemplated.

In order to adjust the height of the seat 56, the seat 56 is raised or lowered as the seat mounting sleeve 62 slides vertically with respect to the seat shaft 60. When the desired height of the seat 56 is reached, the seat mounting sleeve 62 is further adjusted to bring the seat mounting sleeve positioning hole 66 into axial alignment with a nearest seat shaft positioning hole 64. A seat positioning pin is then inserted through the pair of aligned holes to secure the seat mounting sleeve 62 against vertical movement, thereby fixing the seat 56 at the desired height. It is contemplated that the seat 56 can be positioned relative to the surface upon which the adjustable frame 10 rests a distance from the ground that a normal motorcycle seat is disposed. Furthermore, it is contemplated that the seat 56 can be adjusted relative to the surface a substantial distance in one direction or the opposite direction, in order to permit substantial height variation for various rider sizes.

In order to adjust the longitudinal position of the seat 56, the seat cuff 52 is displaced forward or rearward along the component rail 36. When the desired longitudinal position of the seat 56 is reached, the seat cuff 52 is further adjusted to bring the seat cuff positioning hole 58 into axial alignment with a nearest component rail positioning hole 42. A seat cuff positioning pin is then inserted through the pair of aligned holes to secure the seat cuff 52 against longitudinal movement, thereby fixing the seat 56 at the desired longitudinal position.

Figure 5:
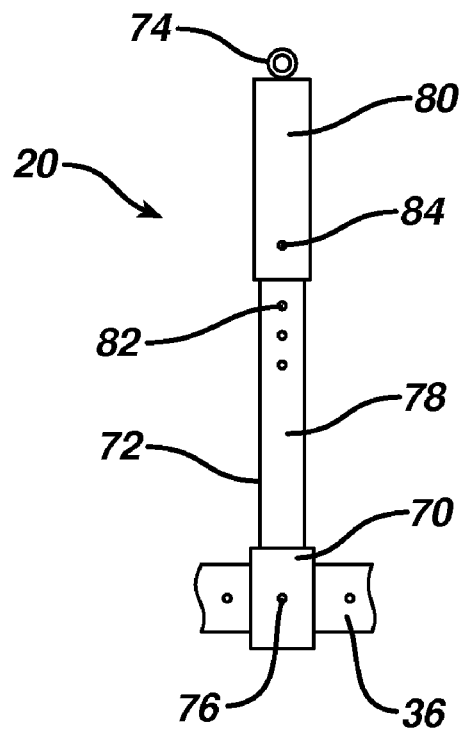
FIG. 5 is an enlarged side view of the handle bar frame portion of the present invention.

Referring to FIGS. 1, 2, 3, and 5, the handle bar frame 20 has a handle bar cuff 70, a handle bar post 72, and a handle bar 74. The handle bar cuff 70, which is similar to the seat cuff 52, has a rectangular opening that receives the component rail 36 therethrough. The handle bar cuff 70 surrounds and slidably engages the component rail 36 as shown in FIG. 5. The interior dimensions of the handle bar cuff 70 are slightly larger than the exterior dimensions of the component rail 36. Thus, the handle bar cuff 70 snugly engages the component rail 36 while allowing longitudinal sliding of the handle bar cuff 70 relative to the component rail 36 for adjustment. An example of an acceptable vertical and lateral distance between the exterior surface of the component rail 36 and the interior surface of the handle bar cuff 70 is 1 millimeter. An example of an acceptable length for the handle bar cuff 70 is 6 inches. Preferably, the handle bar cuff 70 is a short piece of square tubing.

The handle bar cuff 70 has a handle bar cuff positioning hole 76 disposed, preferably, at its vertical and longitudinal midpoint. The handle bar cuff positioning hole 76 provides a transverse, lateral passageway through the handle bar cuff 70 to permit fixing the handle bar cuff 70 in position on the component rail 36. An example of an acceptable diameter for the handle bar cuff positioning hole 76 is 0.5 inches.

The handle bar post 72 has a handle bar shaft 78 that extends upwardly, in an operable orientation, from rigid connection to the handle bar cuff 70. The handle bar post 72 has a set of handle bar shaft positioning holes 82 vertically disposed and evenly-spaced along its height. Each handle bar shaft positioning hole 82 provides a transverse, lateral passageway through the vertical axis of the handle bar shaft 78 that accommodates adjustment of the handle bar 74 as described below. An example of an acceptable diameter for each handle bar shaft positioning hole is 0.5 inches, and an example of an acceptable vertical distance between each handle bar shaft positioning hole is 1 inch.

The handle bar mounting sleeve 80 is defined by a hollow, elongated body that is vertically oriented in an operable position and has a preferably closed, top end and an open bottom end. Additionally, the handle bar mounting sleeve 80 has a handle bar mounting sleeve positioning hole 84 located above its bottom edge that provides a transverse, lateral passageway through the handle bar mounting sleeve 80. An example of an acceptable diameter for the handle bar mounting sleeve positioning hole 84 is 0.5 inches.

The handle bar mounting sleeve 80 fits telescopically over and axially engages the handle bar shaft 78, as the handle bar shaft 78 extends upwardly within the hollow interior of the handle bar mounting sleeve 80. The exterior dimensions of the handle bar shaft 78 are slightly smaller than the interior dimensions of the handle bar mounting sleeve 80, and the handle bar mounting sleeve 80 snugly engages the handle bar shaft 78 while allowing telescopic movement of the handle bar mounting sleeve 80 vertically relative to the handle bar shaft 78. An example of an acceptable longitudinal and lateral distance between the exterior surface of the handle bar shaft 78 and the interior surface of the handle bar mounting sleeve 80 is 1 millimeter.

The handle bar 74 is an elongated shaft that is laterally oriented, in an operable orientation, and affixed substantially at its axial midpoint to the preferably closed, top end of the handle bar mounting sleeve 80. Substantially one half of the handle bar 74 extends laterally outwardly from the handle bar mounting sleeve 80 in one direction, and substantially the other half of the handle bar 74 extends laterally outwardly from the handle bar mounting sleeve 80 in the opposite direction, thereby simulating conventional motorcycle handlebars. The handle bar 74 is preferably welded to the handle bar mounting sleeve 80, but all other suitable means for affixing the handle bar 74 to the handle bar mounting sleeve 80 are contemplated, such as screws, bolts, clamps, locking pins, and adhesives.

Figure 3:
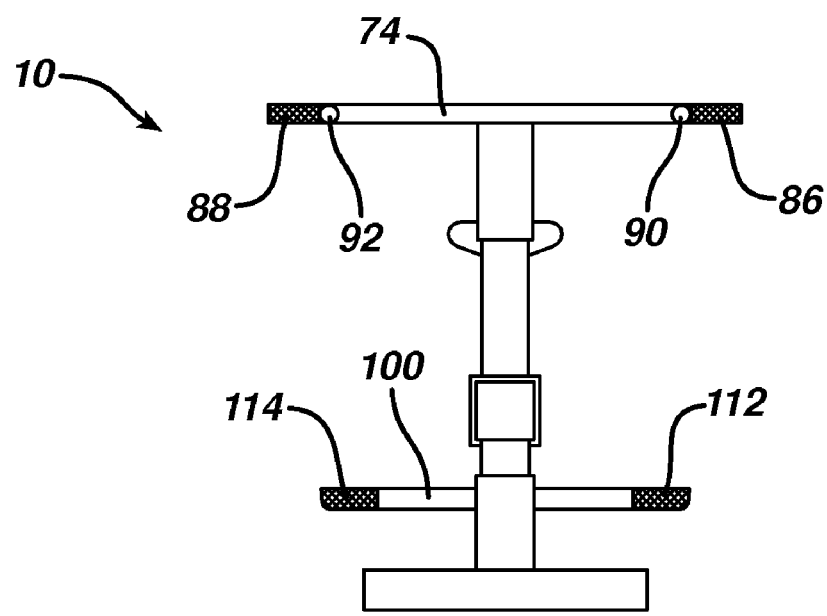
FIG. 3 is an end view illustrating the embodiment of FIG. 1.

The ends of the handle bar 74 terminate in handles 86 and 88 that are adjustably mounted to the handle bar 74 via ball and socket joints 90 and 92 (see FIGS. 2 and 3). Each handle is an elongated shaft, which is preferably rubberized to simulate a conventional motorcycle handlebar grip, that extends from a respective ball and socket joint. The ball and socket joints 90 and 92 are provided to allow adjustment of the orientation of each handle relative to the handle bar 74 by pivoting about the ball and socket joints 90 and 92. However, other means of adjustably affixing the handles 86 and 88 to the handle bar 74, such as hinges, are also contemplated. An example of an acceptable length for each handle is about 5 inches.

In order to adjust the height of the handle bar 74, the handle bar 74 is raised or lowered, as permitted by the handle bar mounting sleeve 80 sliding vertically up or down with respect to the handle bar shaft 78. When the desired height of the handle bar 74 is reached, the handle bar mounting sleeve 80 is further adjusted to bring the handle bar mounting sleeve positioning hole 84 into axial alignment with a nearest handle bar shaft positioning hole 82. A handle bar positioning pin is then inserted through the pair of aligned holes to secure the handle bar mounting sleeve 80 against vertical movement, thereby fixing the handle bar 74 at the desired height.

In order to adjust the longitudinal position of the handle bar 74, the handle bar cuff 70 is displaced along the component rail 36. When the desired longitudinal position of the handle bar 74 is reached, the handle bar cuff 70 is further adjusted to bring the handle bar cuff positioning hole 76 into axial alignment with a nearest component rail positioning hole 42. A handle bar cuff positioning pin is then inserted through the pair of aligned holes to secure the handle bar cuff 70 against longitudinal movement, thereby fixing the handle bar 74 at the desired longitudinal position. Thus, the handlebar 74, and grips 86 and 88, are fixed in a desired position and angle.

In an alternative embodiment, each axial half of the handle bar 74 is telescopically adjustable, in order that the overall width of the handle bar 74 may be made narrower or wider, and therefore the relative position of the handles 86 and 88 may be adjusted. This adjustability is achieved with a telescopic sleeve-shaft-pin combination similar to those described above. Other means for providing width adjustment of the handle bar 74, such as folding or removable axial portions, are also contemplated.

In another alternative embodiment, the handle bar shaft 78 is rotatably affixed to the handle bar cuff 70 for allowing the handle bar shaft 78 to swivel about its axis. This also allows the handle bar 74 and handles 86 and 88 to swivel about the axis of the handle bar shaft 78, thereby providing greater adjustment for a more realistic simulation of engaging a real motorcycle handle bar and handles. Rotatable affixation is achieved with a joint between the shaft and the cuff, however other means of rotatably affixing the handle bar shaft 78 to the handle bar cuff 70 are contemplated.

Figure 6:
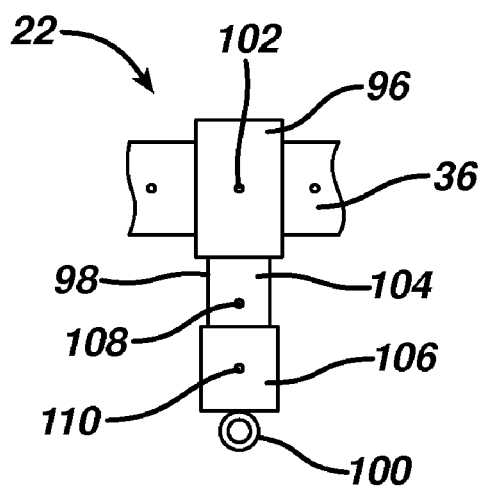
FIG. 6 is an enlarged side view of the foot peg frame portion of the present invention.

Referring to FIGS. 1, 2, 3, and 6, the foot peg frame 22 has a foot peg cuff 96, a foot peg post 98, and a foot peg bar 100. The foot peg cuff 96 has a rectangular opening, similar to the seat cuff 52, that receives the component rail 36 therethrough, and the foot peg cuff 96 surrounds and slidably engages the component rail 36 as shown in FIG. 6. The interior dimensions of the foot peg cuff 96 are slightly larger than the exterior dimensions of the component rail 36. Thus, the foot peg cuff 96 snugly engages the component rail 36 while allowing longitudinal movement of the foot peg cuff 96 relative to the component rail 36 for adjustment. An example of an acceptable vertical and lateral distance between the exterior surface of the component rail 36 and the interior surface of the foot peg cuff 96 is 1 millimeter. An example of an acceptable length for the foot peg cuff 96 is 6 inches. Preferably, the foot peg cuff 96 is a short piece of square tubing.

The foot peg cuff 96 has a foot peg cuff positioning hole 102 disposed at its vertical and longitudinal midpoint that provides a transverse, lateral passageway through the foot peg cuff 96. An example of an acceptable diameter for the foot peg cuff positioning hole 106 (102) is 0.5 inches. The foot peg cuff positioning hole 102 can align with the component rail positioning holes 42 in the component rail 36 as describe below.

The foot peg post 98 has a foot peg shaft 104 that extends downwardly, in an operable orientation, from a rigid connection to the foot peg cuff 96. The foot peg shaft 104 has a set of foot peg shaft positioning holes 108 vertically disposed and evenly-spaced along its height. Each foot peg shaft positioning hole provides a transverse, lateral passageway through the vertical axis of the foot peg shaft 104. An example of an acceptable diameter for each foot peg shaft positioning hole is 0.5 inches, and an example of an acceptable vertical distance between each foot peg shaft positioning hole is 1 inch.

The foot peg mounting sleeve 106 is a hollow, elongated body that is vertically oriented, in an operable orientation, with an open top end and a foot peg mounting sleeve positioning hole 110 located below its top edge that provides a transverse, lateral passageway through the foot peg mounting sleeve 106 for adjustment as described below. An example of an acceptable diameter for the foot peg mounting sleeve positioning hole 110 is 0.5 inches.

The foot peg mounting sleeve 106 fits over and axially engages the foot peg shaft 104 in the manner of a telescope, as the foot peg shaft 104 extends downwardly within the hollow interior of the foot peg mounting sleeve 106. The exterior dimensions of the foot peg shaft 104 are slightly smaller than the interior dimensions of the foot peg mounting sleeve 106, and the foot peg mounting sleeve 106 snugly engages the foot peg shaft 104 while allowing vertical, telescopic movement of the sleeve relative to the shaft. An example of an acceptable longitudinal and lateral distance between the exterior surface of the foot peg shaft 104 and the interior surface of the foot peg mounting sleeve 106 is 1 millimeter.

The foot peg bar 100 is an elongated shaft that is laterally oriented and affixed substantially at its axial midpoint to the closed, bottom end of the foot peg mounting sleeve 106. Preferably, substantially one half of the foot peg bar 100 extends laterally outwardly from the foot peg mounting sleeve 106 in one direction, and the other half of the foot peg bar 100 extends laterally outwardly from the foot peg mounting sleeve 106 in the opposite direction. The foot peg bar 100 is preferably welded to the foot peg mounting sleeve 106, but other suitable means for affixing the foot peg bar 100 to the foot peg mounting sleeve 106 are contemplated.

The ends of the foot peg bar 100 terminate in foot pegs 112 and 114, each of which is an elongated, preferably rubberized, shaft that extends axially from an end of the foot peg bar 100. The foot pegs 112 and 114 are preferably welded to the foot peg bar 100, but other suitable means for affixing the foot pegs 112 and 114 to the foot peg bar 100 are contemplated. An example of an acceptable length for each foot peg is about six inches.

In order to adjust the height of the foot peg bar 100, the foot peg bar 100 is raised or lowered, as permitted by the foot peg mounting sleeve 106 sliding vertically up or down with respect to the foot peg shaft 104. When the desired height of the foot peg bar 100 is reached, the foot peg mounting sleeve 106 is further adjusted to bring the foot peg mounting sleeve positioning hole 110 into axial alignment with a nearest foot peg shaft positioning hole 108. A foot peg positioning pin is then inserted through the pair of aligned holes to secure the foot peg mounting sleeve 106 against vertical movement, thereby fixing the foot peg bar 100 at the desired height.

In order to adjust the longitudinal position of the foot peg bar 100, the foot peg cuff 96 is displaced along the component rail 36. When the desired longitudinal position of the foot peg bar 100 is reached, the foot peg cuff 96 is further adjusted to bring the foot peg cuff positioning hole 102 into axial alignment with a nearest component rail positioning hole 42. A foot peg cuff positioning pin is then inserted through the pair of aligned holes to secure the foot peg cuff 96 against longitudinal movement, thereby fixing the foot peg bar 100 at the desired longitudinal position.

In an alternative embodiment, each axial half of the foot peg bar 100 is telescopically adjustable, thereby permitting the overall width of the foot peg bar 100, and therefore the relative position of the foot pegs 112 and 114, to be made narrower or wider. This adjustability is achieved with a telescopic sleeve-shaft-pin combination similar to those described above, but other means for providing width adjustment of the foot peg bar 100, such as folding or removable axial portions, are contemplated.

Thus, it is apparent that each of the hard points corresponding to the seat, handlebars and foot pegs can be adjustably mounted on the component rail 36. The component rail 36 can be adjusted relative to the surface upon which the adjustable frame 10 mounts, and all of the hard points are fixed in relative position for later fabrication of a motorcycle.

In order to identify or verify the desired hard point positions for a particular motorcycle design, a designer first adjusts the component rail, the seat, the handle bar, the handles, and the foot peg bar to positions that are dictated by preliminary design, previous experience, or any other facts that are relevant. The designer (or the rider who will eventually ride the motorcycle) then sits on the seat and engages the handles and foot pegs with his or her hands and feet. The designer continues to adjust the positions of the various components until a desirable riding posture is found. The desired positions of the hard points can be based upon various factors and can be tested to ensure the hard points produce optimal results. For example, this testing can include placing the adjustable frame 10 in a wind tunnel with the rider seated, adjusting the hard points and further testing performance based upon hard point locations. The components are locked into place once the desired locations are found. Measurement of the positions of the hard points relative to a reference point (i.e. a point on the ground, on one or both of the bases, fixed in space by a computer connected to a video camera, etc.) may be recorded for further use in the design process. These measurements can then be used to create a frame and other components of the desired motorcycle. Thus, the adjustment of the locations of the hard points relative to one another and/or the surface upon which the adjustable frame 10 rests results in a preferred motorcycle without any trial and error.

It should be noted that the frame may be used to tailor the dimensions of a particular design to the dimensions of a specific rider, such as a motorcycle racing rider. In this situation the rider, instead of the designer, mounts the frame and engages in the process of adjustment and measurement described above for use in the design process.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An adjustable frame for identifying and verifying desired hard point positions of a contemplated motorcycle during design of the motorcycle, the adjustable frame comprising:
   (a) at least two frame stands, each frame stand having a base for seating on a stable surface;
   (b) a component rail engaging a first of said frame stands near one rail end, and engaging a second of said frame stands near a second rail end;
   (c) a seat frame adjustably engaging the component rail, the seat frame having an adjustable-height seat post extending upwardly from the rail and a human-engagable seat mounted on the seat post;
   (d) a handle bar frame adjustably engaging the component rail, the handle bar frame having an adjustable-height handle bar post extending upwardly from the rail and a handle bar mounted on top of the handle bar post; and
   (e) a foot peg frame adjustably engaging the component rail, the foot peg frame having an adjustable-height foot peg post extending downwardly from the rail, and a foot peg bar mounted on the bottom of the foot peg shaft.

2. An adjustable frame for identifying and verifying desired hard point positions of a contemplated motorcycle during design of the motorcycle, the adjustable frame comprising:
   (a) at least two frame stands, each frame stand comprising a base and a mounting sleeve, each base for seating on a stable surface and each mounting sleeve extending upwardly from a respective one of the bases;
   (b) a component rail having at least two legs, each leg extending downwardly from the component rail and engaging a respective mounting sleeve;
   (c) a seat frame comprising:
      (i) a seat cuff that adjustably engages the component rail;
      (ii) an adjustable-height seat post extending upwardly from the seat cuff; and
      (iii) a human-engagable seat mounted on the seat post;
   (d) a handle bar frame comprising:
      (i) a handle bar cuff that adjustably engages the component rail;
      (ii) an adjustable-height handle bar post extending upwardly from the handle bar cuff; and
      (iii) a handle bar mounted on top of the handle bar post; and
   (e) a foot peg frame comprising:
      (i) a foot peg cuff that adjustably engages the component rail;
      (ii) an adjustable-height foot peg post extending downwardly from the foot peg cuff; and
      (iii) a foot peg bar mounted on the bottom of the foot peg shaft.

3. The adjustable frame in accordance with claim 2, wherein each mounting sleeve has at least one axially transverse mounting sleeve positioning hole disposed along its height and each leg has at least one axially transverse leg positioning hole disposed along its height, and a stand pin engages an axially aligned pair of said at least one mounting sleeve positioning hole and said at least one leg positioning hole for fixing the component rail at a desired height.

4. The adjustable frame in accordance with claim 2, wherein the seat post further comprises a seat shaft, a seat mounting sleeve, and a seat positioning pin, the seat shaft affixed to, and extending upwardly from, the seat cuff and having at least one axially transverse seat shaft positioning hole disposed along its height, the seat mounting sleeve affixed to and extending downwardly from the seat for axially engaging the seat shaft and having at least one axially transverse seat mounting sleeve positioning hole disposed along its height, the seat positioning pin engaging an axially aligned pair of said at least one seat shaft positioning hole and said at least one seat mounting sleeve positioning hole for fixing the seat at a desired height.

5. The adjustable frame in accordance with claim 2, wherein the handle bar post comprises a handle bar shaft, a handle bar mounting sleeve, and a handle bar positioning pin, the handle bar shaft affixed to, and extending upwardly from, the handle bar cuff and having at least one axially transverse handle bar shaft positioning hole disposed along its height, the handle bar mounting sleeve affixed to and extending downwardly from the handle bar for axially engaging the handle bar shaft and having at least one axially transverse handle bar mounting sleeve positioning hole disposed along its height, the handle bar positioning pin engaging an axially aligned pair of said at least one handle bar shaft positioning hole and said at least one handle bar mounting sleeve positioning hole for fixing the handle bar at a desired height.

6. The adjustable frame in accordance with claim 2, wherein the foot peg post comprises a foot peg shaft, a foot peg mounting sleeve, and a foot peg positioning pin, the foot peg shaft affixed to and extending downwardly from the foot peg cuff and having at least one axially transverse foot peg shaft positioning hole disposed along its height, the foot peg mounting sleeve affixed to and extending upwardly from the foot peg bar for axially engaging the foot peg shaft, having at least one axially transverse foot peg mounting sleeve positioning hole disposed along its height, the foot peg positioning pin engaging an axially aligned pair of said at least one foot peg shaft positioning hole and said at least one foot peg mounting sleeve positioning hole for fixing the foot peg at a desired height.

7. The adjustable frame in accordance with claim 2, wherein the handle bar is telescopically adjustable along its axis in both lateral directions.

8. The adjustable frame in accordance with claim 2, wherein the foot peg bar is telescopically adjustable along its axis in both lateral directions.

9. An adjustable frame in accordance with claim 2, further comprising a pivot joint between the handle bar and each handle for pivotably adjusting the handles.

10. An adjustable frame in accordance with claim 2, wherein the handle bar post is rotatably affixed to the handle bar cuff for allowing the handle bar post to swivel about its axis.

11. An adjustable frame in accordance with claim 2, wherein the component rail has a plurality of transverse component positioning holes disposed along its length.

12. An adjustable frame in accordance with claim 11, wherein the seat cuff has a laterally transverse seat cuff positioning hole, and a seat cuff positioning pin engages an axially aligned pair of said seat cuff positioning hole and one of the component positioning holes for fixing the seat cuff at a desired longitudinal position along the component rail.

13. An adjustable frame in accordance with claim 11, wherein the handle bar cuff has a laterally transverse handle bar cuff positioning hole, and a handle bar cuff positioning pin engages an axially aligned pair of said handle bar cuff positioning hole and one of the component positioning holes for fixing the handle bar cuff at a desired longitudinal position along the component rail.

14. An adjustable frame in accordance with claim 11, wherein the foot peg cuff has a laterally transverse foot peg cuff positioning hole, and a foot peg cuff positioning pin engages an axially aligned pair of said foot peg cuff positioning hole and one of the component positioning holes for fixing the foot peg cuff at a desired longitudinal position along the component rail.

15. A method for identifying and verifying desirable hard point positions of a motorcycle during design of the motorcycle, the method comprising:
 (a) a human sitting on a vertically and horizontally adjustable seat, grasping a pair of handles that are affixed to a pair of vertically and horizontally adjustable handle bars, and placing his or her feet on a pair of vertically and horizontally adjustable foot pegs; and
 (b) adjusting the positions of the seat, the handles, and the foot pegs to identify or verify positions of the seat, the handles, and the foot pegs.

16. The method in accordance with claim 15, further comprising telescopically adjusting the handle bars laterally.

17. The method in accordance with claim 15, further comprising telescopically adjusting the foot pegs laterally.

18. The method in accordance with claim 15, further comprising pivotally adjusting the handles relative to the handle bars.

19. The method in accordance with claim 15, further comprising locking the positions of the seat, the handles, and the foot pegs after they have been adjusted to the desired positions.

20. The method in accordance with claim 15, the method further comprising measuring the positions of the hard points from a reference point after they have been adjusted to the desired positions.

* * * * *